US008643820B2

(12) United States Patent
Zhang et al.

(10) Patent No.: US 8,643,820 B2
(45) Date of Patent: Feb. 4, 2014

(54) ELECTRONIC DEVICE HAVING LIQUID CRYSTAL DISPLAY DEVICE

(75) Inventors: Hongyong Zhang, Atsugi (JP); Shunpei Yamazaki, Setagaya (JP); Satoshi Teramoto, Atsugi (JP); Yoshiharu Hirakata, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 203 days.

(21) Appl. No.: 13/343,011

(22) Filed: Jan. 4, 2012

(65) Prior Publication Data

US 2012/0105788 A1   May 3, 2012

Related U.S. Application Data

(60) Continuation of application No. 12/241,705, filed on Sep. 30, 2008, and a continuation of application No. 11/538,899, filed on Oct. 5, 2006, now Pat. No. 7,474,376, and a division of application No. 10/752,526, filed on Jan. 8, 2004, now Pat. No. 7,215,402, and a continuation of application No. 10/458,648, filed on Jun. 9, 2003, now Pat. No. 7,333,160, and a continuation of application No. 10/143,331, filed on May 9, 2002, now Pat. No. 6,577,372, and a continuation of application No. 09/912,092, filed on Jul. 23, 2001, now Pat. No. 6,404,479, and a continuation of application No. 08/879,583, filed on Jun. 20, 1997, now Pat. No. 6,288,764.

(30) Foreign Application Priority Data

Jun. 25, 1996   (JP) ..................................... 8-185635
Aug. 13, 1996   (JP) ..................................... 8-232608
Sep. 27, 1996   (JP) ..................................... 8-277485

(51) Int. Cl.
*G02F 1/1339*   (2006.01)

(52) U.S. Cl.
USPC ........................... 349/153; 349/155; 349/156

(58) Field of Classification Search
USPC ......................................... 349/153, 155, 156
See application file for complete search history.

(56) References Cited

U.S. PATENT DOCUMENTS 4,068,923 A   1/1978   Toida
4,457,589 A   7/1984   Tamura et al.
(Continued)

FOREIGN PATENT DOCUMENTS

EP   0 402 170   12/1990
JP   40-1049022   2/1989
(Continued)

OTHER PUBLICATIONS

Office Action (U.S. Appl. No. 10/458,648 filed Jun. 6, 2003) mailed Aug. 5, 2005.
(Continued)

*Primary Examiner* — Huyen Ngo
(74) *Attorney, Agent, or Firm* — Eric J. Robinson; Robinson Intellectual Property Law Office, P.C.

(57) ABSTRACT

A display device of the present invention includes a thin film transistor in a pixel region formed over a substrate, the thin film transistor including an active layer and a gate electrode with a gate insulating film interposed between the active layer and the gate electrode, a silicon nitride film formed over the thin film transistor, a resin film formed over the silicon nitride film, an inorganic insulating film formed over the resin film; a metal layer formed over the substrate; and a sealing material formed over the metal layer, wherein the sealing material covers a region where the resin film is not formed over the silicon nitride film.

45 Claims, 10 Drawing Sheets

(56) References Cited

U.S. PATENT DOCUMENTS

| | | | |
|---|---|---|---|
| 4,640,584 | A | 2/1987 | Tsubakimoto et al. |
| 5,108,650 | A | 4/1992 | Koden et al. |
| 5,108,651 | A | 4/1992 | Terashima et al. |
| 5,148,301 | A | 9/1992 | Sawatsubashi et al. |
| 5,151,689 | A | 9/1992 | Kabuto et al. |
| 5,155,612 | A | 10/1992 | Adachi et al. |
| 5,182,620 | A | 1/1993 | Shimada et al. |
| 5,237,439 | A | 8/1993 | Misono et al. |
| 5,245,457 | A | 9/1993 | Fukuchi |
| 5,300,446 | A | 4/1994 | Fujioka |
| 5,323,254 | A | 6/1994 | Pitt |
| 5,336,535 | A | 8/1994 | Fukuchi et al. |
| 5,432,626 | A | 7/1995 | Sasuga et al. |
| 5,488,498 | A | 1/1996 | Fujii et al. |
| 5,510,918 | A | 4/1996 | Matsunaga et al. |
| 5,516,712 | A | 5/1996 | Wei et al. |
| 5,523,865 | A | 6/1996 | Furuta et al. |
| 5,530,568 | A | 6/1996 | Yamamoto et al. |
| 5,541,748 | A | 7/1996 | Ono et al. |
| 5,583,534 | A | 12/1996 | Katakura et al. |
| 5,600,460 | A | 2/1997 | Yamamoto et al. |
| 5,606,194 | A | 2/1997 | Lebrun et al. |
| 5,633,739 | A | 5/1997 | Matsuyama et al. |
| 5,637,187 | A | 6/1997 | Takasu et al. |
| 5,637,359 | A | 6/1997 | Fukuchi et al. |
| 5,640,216 | A | 6/1997 | Hasegawa et al. |
| 5,644,373 | A | 7/1997 | Furushima et al. |
| 5,659,379 | A | 8/1997 | Morimoto |
| 5,663,577 | A | 9/1997 | Kwasnick et al. |
| 5,680,183 | A | 10/1997 | Sasuga et al. |
| 5,684,555 | A | 11/1997 | Shiba et al. |
| 5,686,328 | A | 11/1997 | Zhang et al. |
| 5,693,959 | A | 12/1997 | Inoue et al. |
| 5,721,601 | A | 2/1998 | Yamaji et al. |
| 5,726,720 | A | 3/1998 | Watanabe et al. |
| 5,729,312 | A * | 3/1998 | Yamagishi et al. ............ 349/86 |
| 5,731,600 | A | 3/1998 | Codama et al. |
| 5,739,549 | A | 4/1998 | Takemura et al. |
| 5,757,450 | A | 5/1998 | Fujii et al. |
| 5,774,198 | A | 6/1998 | Fukumoto et al. |
| 5,777,701 | A | 7/1998 | Zhang |
| 5,812,231 | A | 9/1998 | Kochi et al. |
| 5,828,429 | A | 10/1998 | Takemura |
| 5,834,327 | A | 11/1998 | Yamazaki et al. |
| 5,838,411 | A | 11/1998 | Hayakawa et al. |
| 5,888,856 | A | 3/1999 | Hamada |
| 5,892,562 | A | 4/1999 | Yamazaki et al. |
| 5,898,204 | A | 4/1999 | Watanabe |
| 5,936,698 | A | 8/1999 | Koyama |
| 5,952,708 | A | 9/1999 | Yamazaki |
| 5,963,288 | A | 10/1999 | Sato et al. |
| 5,990,542 | A | 11/1999 | Yamazaki |
| 6,011,607 | A | 1/2000 | Yamazaki et al. |
| 6,037,017 | A | 3/2000 | Kashiro |
| 6,055,034 | A | 4/2000 | Zhang et al. |
| 6,057,900 | A | 5/2000 | Ono et al. |
| 6,072,556 | A | 6/2000 | Hirakata et al. |
| 6,075,580 | A | 6/2000 | Kouchi |
| 6,128,052 | A | 10/2000 | Asaba et al. |
| 6,153,893 | A | 11/2000 | Inoue et al. |
| 6,413,805 | B1 | 7/2002 | Zhang et al. |
| 6,498,369 | B1 | 12/2002 | Yamazaki et al. |
| 6,943,863 | B2 * | 9/2005 | Fujioka et al. ............... 349/153 |
| 7,561,242 | B2 * | 7/2009 | Hirakata et al. ............. 349/152 |

FOREIGN PATENT DOCUMENTS

| | | |
|---|---|---|
| JP | 64-049022 | 2/1989 |
| JP | 03-012635 | 1/1991 |
| JP | 03-058027 | 3/1991 |
| JP | 04-324826 | 11/1992 |
| JP | 05-210369 | 8/1993 |
| JP | 05-303097 | 11/1993 |
| JP | 06-095094 | 4/1994 |
| JP | 06-118404 | 4/1994 |
| JP | 06-138488 | 5/1994 |
| JP | 06-138491 | 5/1994 |
| JP | 40-6138488 | 5/1994 |
| JP | 06-186580 | 7/1994 |
| JP | 06-186588 | 7/1994 |
| JP | 06-258659 | 9/1994 |
| JP | 06-258661 | 9/1994 |
| JP | 06-258662 | 9/1994 |
| JP | 06-301045 | 10/1994 |
| JP | 07-281197 | 10/1995 |
| JP | 08-069010 | 3/1996 |
| JP | 08-136911 | 5/1996 |
| JP | 08-234215 | 9/1996 |

OTHER PUBLICATIONS

Office Action (U.S. Appl. No. 10/458,648) dated Apr. 29, 2005.

Complaint for Patent Infringement, *Semiconductor Energy Laboratory Co., Ltd.*, Plaintiff, v *Samsung Electronics Co., Ltd.*, S-LCD Corporation, Samsung Electronics America, Inc. and Samsung Telecommunications America, LLC., Defendants, filed Jan. 2, 2009; Civil Action No. 3:09-CV-0001; pp. 1-19.

Answer, Defenses, and Counterclaims of Defendants Samsung Electronics Co., Ltd., S-LCD Corporation, Samsung Electronics America, Inc. and Samsung Telecommunications America, LLC, dated Apr. 9, 2009, pp. 1-29.

First Amended Answer, Defenses, and Counterclaims of Defendants Samsung Electronics Co., Ltd., S-LCD Corporation, Samsung Electronics America, Inc. and Samsung Telecommunications America, LLC, dated Jul. 1, 2009, 33 pages, Civil Action No. 3:09-CV-00001.

*JP 05-210369, full translation prepared by Plaintiff, SEL.

*JP 05-210369, full translation prepared by Defendants, Samsung.

**JP 07-281197, full translation prepared by Plaintiff, SEL.

**JP 07-281197, full translation prepared by Defendants, Samsung.

Samsung Electronics Co., Ltd.'s Second Supplemental Responses to SEL's First Set of Interrogatories, dated Jul. 14, 2009, 73 pages, Civil Action No. 3:09-CV-00001.

Defendants' Answer, Defenses, and Counterclaims to Plaintiff's First Amended Complaint, dated Jul. 14, 2009, 33 pages, Civil Action No. 3:09-CV-00001.

Response to Defendants' First Set of Interrogatories to Plaintiff Semiconductor Energy Laboratory Co., Ltd. (Appendix A-E), dated May 29, 2009, 102 pages, Civil Action No. 3:09-CV-00001.

Response to Defendants' Second Set of Interrogatories to Plaintiff Semiconductor Energy Laboratory Co., Ltd. (Appendix A-B), dated Jul. 27, 2009, 38 pages, Civil Action No. 3:09-CV-00001.

Plaintiff and Counterclaim Defendant SEL's answer to Defendants' Counterclaims, dated Jul. 28, 2009, 14 pages, Civil Action No. 3:09-CV-00001.

Motion to Dismiss and/or strike certain counterclaims and defenses, dated Jul. 28, 2009, 2 pages, Civil Action No. 3:09-CV-00001.

SEL's Memorandum in Support of its Motion to Dismiss and/or Strike Certain Counterclaims and Defenses, dated Jul. 28, 2009, 15 pages, Civil Action No. 3:09-CV-00001.

Motion for leave to file instanter (1) amended motion to dismiss and/or strike inequitable conduct allegations based on new federal circuit authority; and (2) amended answer to counterclaim, dated Aug. 11, 2009, 5 pages, Civil Action No. 3:09-CV-00001.

SEL's Motion and Memorandum in Support of its Amended Motion to Dismiss and/or Strike Inequitable Conduct Allegations, dated Aug. 11, 2009, 30 pages, Civil Action No. 3:09-CV-00001.

Plaintiff and Counterclaim Defendant SEL's amended answer to Defendants' Counterclaims, dated Aug. 11, 2009, 15 pages, Civil Action No. 3:09-CV-00001.

Plaintiff and Counterclaim Defendant SEL's amended answer to Defendants' Counterclaims, dated Aug. 13, 2009, 14 pages, Civil Action No. 3:09-CV-00001.

SEL's Motion and Memorandum in Support of its Amended Motion to Dismiss and/or Strike Inequitable Conduct Allegations, dated Aug. 13, 2009, 30 pages, Civil Action No. 3:09-CV-00001.

Samsung Electronics Co., Ltd.'s Fourth Supplemental Responses to SEL's First Set of Interrogatories (Exhibit A-D), dated Aug. 28, 2009, 83 pages, Civil Action No. 3:09-CV-00001.

(56) References Cited

OTHER PUBLICATIONS

First Supplemental and Revised Response to Defendants' Interrogatory No. 5 to Plaintiff Semiconductor Energy Laboratory Co., Ltd. (Appendix A-H), dated Aug. 28, 2009, 161 pages, Civil Action No. 3:09-CV-00001.

Plaintiff Semiconductor Energy Laboratory Co., Ltd.'s list of proposed claim terms and proposed claim construction, dated Aug. 31, 2009, 3 pages, Civil Action No. 3:09-CV-00001.

Defendants' disclosure of claim terms to be construed and proposed constructions, dated Aug. 31, 2009, 4 pages, Civil Action No. 3:09-CV-00001.

Defendants' first amended answer, defenses, and counterclaims to plaintiff's first amended complaint, dated Sep. 1, 2009, 55 pages, Civil Action No. 3:09-CV-00001.

Docket Sheet Jan. 2, 2009 through Sep. 3, 2009, 9 pages, Civil Action No. 3:09-CV-00001.

Second Supplemental response to defendants' interrogatory No. 5 to plaintiff Semiconductor Energy Laboratory Co., Ltd., dated Sep. 14, 2009, 50 pages, Civil Action No. 3:09-CV-00001-BBC.

Plaintiff Semiconductor Energy Laboratory Co., Ltd.'s response to defendants' disclosure of claim terms to be construed and proposed constructions, dated Sep. 14, 2009, 5 pages, Civil Action No. 3:09-CV-00001-BBC.

Defendants' Response to Sel's Proposed Constructions, dated Sep. 14, 2009, 3 pages, Civil Action No. 3:09-CV-00001.

Plaintiff and Counterclaim Defendant SEL's answer to Defendants' first amended counterclaims, dated Sep. 24, 2009, 14 pages, Civil Action No. 3:09-CV-00001.

SEL's Memorandum in support of Motion to Dismiss and/or Strike Inequitable Conduct Allegations in Samsung'S Amended Answer, dated Sep. 24, 2009, 34 pages, Civil Action No. 3:09-CV-00001-BBC.

Proposed Order, filed Sep. 24, 2009, 1 page, Civil Action No. 3:09-CV-00001.

Motion to Dismiss and/or Strike Inequitable Conduct Allegations in Samsung's Amended Answer, dated Sep. 24, 2009, 2 pages, Civil Action No. 3:09-CV-00001-BBC.

Defendants' First Amended Response to SEL's Proposed Constructions, dated Oct. 5, 2009, 3 pages, Civil Action No. 3:09-CV-00001.

Defendants' First Amended Disclosure of Claim Terms to be Construed and Proposed Constructions, dated Oct. 5, 2009, 4 pages, Civil Action No. 3:09-CV-00001.

Defendants' Corrected First Amended Disclosure of Claim Terms to be Construed and Proposed Constructions, dated Oct. 6, 2009, 4 pages, Civil Action No. 3:09-CV-00001.

Plaintiff Semiconductor Energy Laboratory Co., Ltd.'s Opening Claim Construction Brief, dated Oct. 7, 2009, 85 pages, Civil Action No. 3:09-CV-00001-BBC.

SEL'S Motion requesting Claim Construction and Hearing, dated Oct. 7, 2009, 4 pages, Civil Action No. 3:09-CV-00001-BBC.

Defendant's Motion for Construction of Claims, dated Oct. 7, 2009, 4 pages, Civil Action No. 3:09-CV-00001.

Samsung's Opening Claim Construction Brief, dated Oct. 7, 2009, 83 pages, Civil Action No. 3:09-CV-00001.

Declaration of Nicholas J. Whilt in support of Samsung's opening Claim Construction Brief, dated Oct. 7, 2009, 912 pages, Civil Action No. 3:09-CV-00001.

Samsung's opposition to SEL's motion to dismiss and/or strike inequitable conduct allegations in Samsung's amended answer, dated Oct. 15, 2009, 50 pages, Civil Action No. 3:09-CV-00001.

SEL's reply in support of its motion to dismiss and/or strike inequitable conduct allegations in Samsung's amended answer, dated Oct. 26, 2009, 34 pages, Civil Action No. 3:09-CV-00001.

SEL's response to Samsung's opening claim construction brief, dated Oct. 28, 2009, 83 pages, Civil Action No. 3:09-CV-00001-BBC.

Samsung's responsive claim construction brief, dated Oct. 28, 2009, 62 pages, Civil Action No. 3:09-CV-00001.

Third Supplemental Response to Defendants' Interrogatory No. 5 to Plaintiff Semiconductor Energy Laboratory Co., Ltd., dated Nov. 2, 2009, 9 pages, Civil Action No. 3:09-CV-00001-BBC.

SEL'S Supplemental Response to Defendants' Interrogatory No. 16, dated Nov. 20, 2009, 21 pages, Civil Action No. 3:09-CV-00001-BBC.

Samsung Electronics Co., Ltd.'s fifth supplemental responses to SEL's first set of interrogatories, dated Dec. 9, 2009, 184 pages, Civil Action No. 3:09-CV-00001.

Expert report of Dr. Timothy J. Drabik regarding invalidity of U.S. patent Nos. 7,215,402 and 7,394,516, dated Dec. 15, 2009, 656 pages, Civil Action No. 3:09-CV-00001.

Expert Report of Professor Paul A. Kohl, dated Dec. 15, 2009, 45 pages, Civil Action No. 3:09-CV-00001-BBC.

Defendants' third amended answer, defenses, and counterclaims to plaintiff's first amended complaint, dated Dec. 28, 2009, 63 pages, Civil Action No. 3:09-CV-00001.

Samsung Electronics Co., Ltd.'s second supplemental responses to SEL's second set of interrogatories, dated Dec. 31, 2009, 16 pages, Civil Action No. 3:09-CV-00001.

Samsung Electronics Co., Ltd.'s seventh supplemental responses to SEL's first set of interrogatories, dated Dec. 31, 2009, 26 pages, Civil Action No. 3:09-CV-00001.

Opinion and order, dated Jan. 5, 2010, 36 pages, Civil Action No. 3:09-CV-00001-BBC.

SEL's Supplemental Response to Defendants' Interrogatory No. 12, dated Jan. 12, 2010, 9 pages, Civil Action No. 3:09-CV-00001-BBC.

Defendants' second amended answer, defenses, and counterclaims to plaintiffs first amended complaint, dated Jan. 15, 2010, 56 pages, Civil Action No. 3:09-CV-00001.

Expert Witness Response to Report of Timothy J. Drabik by Paul A. Kohl, Ph.D., dated Jan. 20, 2010, 212 pages, Civil Action No. 3:09-CV-00001-BBC.

Rebuttal Expert Witness Report of John P. Bradley, Ph.,D., dated Jan. 20, 2010, 19 pages, Civil Action No. 3:09-CV-00001-BBC.

Supplemental responses to Defendants' interrogatory Nos. 1, 2-3, 5-6, 8-9, 11-12, and 16-18 to Plaintiff Semiconductor Energy Laboratory co., ltd., dated Jan. 21, 2010, 29 pages, Civil Action No. 3:09-CV-00001-BBC.

Plaintiffs motion for partial summary judgment, dated Jan. 22, 2010, 4 pages, Civil Action No. 3:09-CV-00001-BBC.

Declaration of Jeffrey A. Koppy in support of partial summary judgment, dated Jan. 22, 2010, 2558 pages, Civil Action No. 3:09-CV-00001-BBC.

Defendant Samsung's Motion for Summary Judgment Regarding U.S. Patent Nos. 6,900,463, 7,413,937, 7,215,402, and 7,394,516, dated Jan. 22, 2010, 4 pages, Civil Action No. 3:09-CV-00001.

Proposed findings of fact in support of Samsung's motion for summary judgment regarding U.S. patent Nos. 6,900,463,7,413,937,7,215,402, and 7,394,516, dated Jan. 22, 2010, 208 pages, Civil Action No. 3:09-CV-00001.

Declaration of Ryan K. Yagura in support of Samsung's motion for summary judgment, dated Jan. 22, 2010, 3805 pages, Civil Action No. 3:09-CV-0000L.

Defendants' third amended answer, defenses, and counterclaims to plaintiff 's first amended complaint, dated Jan. 22, 2010, 62 pages, Civil Action No. 3:09-CV-00001.

Declaration of Dr. Timothy J. Drabik in support of Samsung's Motion for Summary Judgment, dated Jan. 22, 2010, 152 pages, Civil Action No. 3:09-CV-00001.

Corrected SEL's memorandum of law in support of its motion for partial summary judgment, dated Jan. 26, 2010, originally 134 pages, 108 pages as redacted and submitted herewith, Civil Action No. 3:09-CV-00001-BBC.

Corrected proposed findings of fact, dated Jan. 26, 2010, originally 84 pages, 55 pages as redacted and submitted herewith, Civil Action No. 3:09-CV-00001-BBC.

Corrected proposed finding of facts in support of Samsung's motion for summary judgment regarding U.S. Patent Nos. 6,900,463, 7,413,937, 7,215,402, and 7,394,516, dated Jan. 29, 2010, 208 pages, Civil Action No. 3:09-CV-00001.

(56) References Cited

OTHER PUBLICATIONS

Corrected brief in support of Samsung's motion for summary judgment regarding U.S. Patent Nos. 6,900,463, 7,413,937, 7,215,402, and 7,394,516, dated Jan. 29, 2010, 157 pages, Civil Action No. 3:09-CV-00001.
Samsung's Corrected Exhibits to Declaration of Motion for Summary Judgment, dated Jan. 29, 2010, 50 pages, Civil Action No. 3:09-CV-00001-BBC.
Plaintiff and counterdefendant SEL's Answer to Defendants' third amended counterclaims, dated Feb. 5, 2010, 14 pages, Civil Action No. 3:09-CV-00001-BBC.
Docket Sheet Sep. 19, 2009 through Feb. 5, 2010, 44 pages, Civil Action No. 3:09-CV-00001.
Samsung's Opposition to SEL's Corrected Motion for Partial Summary Judgment with Exhibit(s) dated Feb. 12, 2010, 219 pages, Civil Action No. 3:09-CV-00001.
Supplemental Declaration of Dr. Timothy J. Drabik in Support of Samsung's Opposition to SEL's Corrected Motion for Partial Summary Judgment with Exhibits dated Feb. 12, 2010, originally 90 pages, 76 pages as redacted and submitted herewith, Civil Action No. 3:09-CV-00001.
Samsung's Supplemental Proposed Findings of Fact in Opposition to SEL's Corrected Motion for Partial Summary Judgment dated Feb. 12, 2010, 248 pages, Civil Action No. 3:09-CV-00001.
Samsung's Response to SEL's Corrected Proposed Findings of Fact dated Feb. 12, 2010, 222 pages, Civil Action No. 3:09-CV-00001.
SEL's Response to Defendants' Motion for Summary Judgment dated Feb. 12, 2010, 171 pages, Civil Action No. 3:09-CV-00001.
Declaration of Jeffrey A. Koppy in Support of SEL's Response to Defendants' Motion for Summary Judgment, Exhibits 51-76, dated Feb. 13, 2010, 532 pages, Civil Action No. 3:09-CV-00001.
Supplemental Declaration of Ryan K. Yagura in Support of Samsung's Opposition to SEL's Motion for Partial Summary Judgment, Exhibits 272-301, dated Feb. 13, 2010, 691 pages, Civil Action No. 3:09-CV-00001.
Supplemental Declaration of Ryan K. Yagura in Support of Samsung's Opposition to SEL's Motion for Partial Summary Judgment, Exhibits 351-400, dated Feb. 13, 2010, 691 pages, Civil Action No. 3:09-CV-00001.
Supplemental Declaration of Ryan K. Yagura in Support of Samsung's Opposition to SEL's Motion for Partial Summary Judgment, Exhibits 401-450, dated Feb. 13, 2010, 503 pages, Civil Action No. 3:09-CV-00001.
Supplemental Declaration of Ryan K. Yagura in Support of Samsung's Opposition to SEL's Motion for Partial Summary Judgment, Exhibits 451-509, dated Feb. 13, 2010, 486 pages, Civil Action No. 3:09-CV-00001.
SEL's Responsive Proposed Findings of Fact in Support of Its Opposition to Defendants' Motion for Summary Judgment Regarding U.S. Patent Nos. 6,900,463, 7,413,937, 7,215,402, 7,394,516 dated Feb. 13, 2010, originally 125 pages, 114 pages as redacted and submitted herewith, Civil Action No. 3:09-CV-00001.
SEL's Response to Samsung's Proposed Findings of Fact dated Feb. 13, 2010, 336 pages, Civil Action No. 3:09-CV-00001.
Samsung's Reply in Support of its Corrected Motion for Summary Judgment dated Feb. 22, 2010, 178 pages, Civil Action No. 3:09-CV-00001.
Reply to SEL's Response to Samsung's Proposed Findings of Fact dated Feb. 22, 2010, 812 pages, Civil Action No. 3:09-CV-00001.
Response to SEL's Responsive Proposed Findings of Fact in Support of Its Opposition to Defendants' Motion for Summary Judgment Regarding U.S. Patent Nos. 6,900,463, 7,413,937, 7,215,402, 7,394,516 dated Feb. 22, 2010, originally 359 pages, 328 pages as redacted and submitted herewith, Civil Action No. 3:09-CV-00001.
SEL's Reply in Support of its Motion for Partial Summary Judgment dated Feb. 22, 2010, originally 162 pages, 141 pages as redacted and submitted herewith, Civil Action No. 3:09-CV-00001.
SEL's Response to Samsung's Supplemental Proposed Findings of Fact in Opposition to SEL's Corrected Motion for Partial Summary Judgment dated Feb. 22, 2010, 439 pages, Civil Action No. 3:09-CV-00001.
SEL's Reply to Samsung's Response to SEL's Corrected Proposed Findings of Fact dated Feb. 22, 2010, 263 pages, Civil Action No. 3:09-CV-00001.
Samsung Electronics Co., Ltd.'s Fifth Supplemental Responses to SEL's Interrogatory No. 3 with Exhibits dated Apr. 13, 2010, 45 pages, Civil Action No. 3:09-CV-00001.
Samsung's Opposition to SEL's Motion for Leave to Supplement the Expert Witness Report of Professor Paul A. Kohl dated Apr. 30, 2010, 18 pages, Civil Action No. 3:09-CV-00001.
Second Declaration of Brian M. Berliner in Support of Samsung's Brief in Opposition to SEL's Motion for Leave to Supplement the Expert Witness Report of Professor Paul A. Kohl with Exhibits dated Apr. 30, 2010, 21 pages, Civil Action No. 3:09-CV-00001.
Reply Brief in Support of SEL's Motion for Leave to Supplement the Expert Witness Report of Professor Paul A. Kohl dated May 5, 2010, 17 pages, Civil Action No. 3:09-CV-00001.
Declaration of Jeffrey A. Koppy in Support of SEL's Reply of SEL's Motion to Supplement the Expert Witness Report of Professor Paul A. Kohl with Exhibits dated May 5, 2010, 10 pages, Civil Action No. 3:09-CV-00001.
Supplemental Responses to Defendants' Interrogatory Nos. 3, 5-10, 12, 16-17, 22-24, and 27 to Plaintiff Semiconductor Energy Laboratory Co., Ltd. dated May 7, 2010, 25 pages, Civil Action No. 3:09-CV-00001.
Response to Defendants' Seventh Set of Interrogatories (Nos. 29-40) to Plaintiff Semiconductor Energy Laboratory Co., Ltd. dated May 7, 2010, 23 pages, Civil Action No. 3:09-CV-00001.
Response to Defendants' First Set of Request for Admission dated May 7, 2010, 42 pages, Civil Action No. 3:09-CV-00001.
Response to Defendants' Second Set of Request for Admission, dated May 7, 2010, 9 pages, Civil Action No. 3:09-CV-00001.
Samsung Electronics Co., Ltd.'s Responses to SEL's First Set of Requests for Admissions dated May 7, 2010, 5 pages, Civil Action No. 3:09-CV-00001.
Samsung Mobile Display Co., Ltd.'s Response to SEL's First Set of Requests for Admission dated May 7, 2010, 5 pages, Civil Action No. 3:09-CV-00001.
Samsung Electronics America, Inc.'s Response to SEL's First Set of Requests for Admission dated May 7, 2010, 5 pages, Civil Action No. 3:09-CV-00001.
Samsung Telecommunications America, LLC's Responses to SEL's First Set of Requests for Admission dated May 7, 2010, 5 pages, Civil Action No. 3:09-CV-00001.
S-LCD Corporation's Response to SEL's First Set of Requests for Admission dated May 7, 2010, 5 pages, Civil Action No. 3:09-CV-00001.
Samsung Electronics Co., Ltd.'s Third Supplemental Response to SEL's Second Set of Interrogatories dated May 7, 2010, 23 pages, Civil Action No. 3:09-CV-00001.
Samsung Electronics Co., Ltd.'s Thirteenth Supplemental Response to SEL's First Set of Interrogatories dated May 7, 2010, 54 pages, Civil Action No. 3:09-CV-00001.
Docket Sheet Feb. 6, 2010 through May 7, 2010, 59 pages, Civil Action No. 3:09-CV-00001.

* cited by examiner ial type liquid crystal display device

ELECTRONIC DEVICE HAVING LIQUID CRYSTAL DISPLAY DEVICE

CROSS-REFERENCE TO RELATED APPLICATIONS

This application is a continuation (and claims the benefit of priority under 35 USC 120) of U.S. application Ser. No. 11/538,899, filed Oct. 5, 2006, now allowed, which is a divisional of U.S. application Ser. No. 10/752,526, filed Jan. 8, 2004, now U.S. Pat. No. 7,215,402, which is a continuation of U.S. application Ser. No. 10/458,648, filed Jun. 9, 2003, now U.S. Pat. No. 7,333,160, which is a continuation of U.S. application Ser. No. 10/143,331, filed on May 9, 2002, now U.S. Pat. No. 6,577,372, which is a continuation of U.S. application Ser. No. 09/912,092, filed on Jul. 23, 2001, now U.S. Pat. No. 6,404,479, which is a continuation of U.S. application Ser. No. 08/879,583, filed on Jun. 20, 1997, now U.S. Pat. No. 6,288,764, which claims the benefit of foreign priority applications filed in Japan as Serial No. 08-185635 on Jun. 25, 1996, as Serial No. 08-232608 on Aug. 13, 1996 and as Serial No. 08-277485 on Sep. 27, 1996, all of which are incorporated by reference.

BACKGROUND OF THE INVENTION

1. Field of the Invention

The present invention relates to a configuration of an active matrix type liquid crystal display integrated with a peripheral driving circuit.

2. Description of Related Art

Active matrix type liquid crystal displays have been known. They have a configuration in which an active matrix circuit and a peripheral driving circuit for driving the same circuit are integrated on a glass substrate or quartz substrate.

In such a liquid crystal panel integrated with a peripheral driving circuit, a thin film semiconductor that forms thin film transistors provided in the peripheral driving circuit must be a crystalline silicon thin film. The reason for this is that the peripheral driving circuit must operate at a high speed.

Reliability is an important consideration for a liquid crystal panel integrated with a peripheral driving circuit as described above. Specifically, what is important for such a device is the stability of image display in relation to the environment where it is used.

Especially, a crystalline silicon film has a problem in that it is significantly susceptible to the variation of characteristics with time and the influence of the environment where it is used because of the high level of characteristics of itself.

Specifically, a problem arises in that it is affected by stresses exerted thereon during the fabrication and handling of a liquid crystal panel and by moisture that permeates into the liquid crystal panel.

Further, a liquid crystal panel integrated with a peripheral driving circuit is designed in an intention to minimize the surface area of regions unnecessary for screen display. For example, efforts are put in minimizing the surface area occupied by the peripheral driving circuit.

Meanwhile, in a liquid crystal display, an encapsulating material for enclosing liquid crystal, referred to as "sealing material" is provided a peripheral portion to hold liquid crystal between a pair of substrates.

As an effort to minimize the surface area of regions unnecessary for screen display as described above, the surface area occupied by the sealing material must be also reduced. A configuration for this purpose is known in which a sealing material is provided on a peripheral driving circuit to minimize the surface area excluding pixels (referred to as "frame").

In the case of an active matrix type liquid crystal display integrated with a peripheral driving circuit, faults that occur in the peripheral driving circuit can be a problem.

Especially, the configuration in which a sealing material is provided on a peripheral driving circuit to minimize the surface area excluding pixels (referred to as "frame") is subjected to more faults at the peripheral driving circuit.

This problem occurs due to the following reasons. A sealing material includes a kind of spacer referred to as "filler" for maintaining a gap between substrates.

In general, a peripheral driving circuit is at a high level of integration. As a result, thin film transistors and wiring lines located directly under such fillers are subjected to a pressure from the fillers (it is assumed that this pressure can be locally quite high) and are hence vulnerable to line breakage and poor contact.

Meanwhile, a spherical substrate gap maintaining means referred to as "spacer" 101 is used also in an active matrix region. However, since an active matrix region is at a lower level of integration, faults attributable to the presence of a spacer are not as problematic as in a peripheral driving circuit.

It is an object of the invention disclosed in this specification to provide a configuration for an active matrix type liquid crystal display incorporating a peripheral driving circuit, in which the surface area excluding the region of a pixel matrix circuit is minimized.

On the basis of the above-described configuration, it is another object of the invention to provide a configuration that prevents breakage of thin film transistors provided on a peripheral driving circuit due to a pressure exerted by a sealing material.

It is still another object of the invention to provide a configuration for an active matrix type liquid crystal display incorporating a peripheral driving circuit, which prevents thin film transistors from being adversely affected by a stress exerted thereon during the fabrication and handling of the liquid crystal panel and which prevents moisture from permeating into the liquid crystal panel.

SUMMARY OF THE INVENTION

In order to solve the above-described problems, as a mode of carrying out the invention disclosed in this specification, there is provided an active matrix type liquid crystal display integrated with a peripheral driving circuit as shown in FIG. 1 having a configuration in which:

a sealing material 104 is provided on the peripheral driving circuit; and resin layers 237 and 240 are provided between the peripheral driving circuit and the sealing material.

The above-described configuration makes it possible to prevent a high pressure from being locally applied to the peripheral driving circuit by a filler 103 included in the sealing material 104, thereby preventing the breakage of the peripheral driving circuit.

Further, by providing the sealing material on the peripheral driving circuit, a configuration can be obtained in which the surface area excluding the pixel region is minimized.

In the above-described configuration, each of the resin layers are preferably formed as multilayered form. This is effective in moderating the pressure exerted thereon by the filler in the sealing material.

Further, it is advantageous to form an auxiliary capacitor in the active matrix region using the resin layers. This makes it possible to provide a capacitor having a required value in a pixel.

The thickness of the resin layers is preferably equal to greater than one-half of the diameter of a filler in the sealing material. This is a condition advantageous in preventing the pressure of a filler in the sealing material from being exerted on the peripheral driving circuit even if the filler sinks into the resin layers. Further, in order to moderate a pressure exerted on the peripheral driving circuit, a highly elastic material such as polyimide may be chosen for the resin layers. When the resin layers are formed as a multilayered form, it will be sufficient if the collective thickness is equal to or greater than one-half of the diameter of a filler in the sealing material.

In order to solve the above-described problems, as specifically illustrated in FIG. 6, there is provided a configuration in which a liquid crystal material 314 is sandwiched and held between a pair of glass substrates 301 and 318, characterized in that:

an active matrix circuit (constituted by a thin film transistor indicated by 302) and a peripheral driving circuit (constituted by a thin film transistor indicated by 303) are provided on the surface of one of the substrates 301;

a resin material is provided on the peripheral driving circuit as interlayer insulating films 306, 309, and 311;

the liquid crystal material 314 is sealed with a sealing material 315;

the resin material and the sealing material partially overlap with each other; and the resin material is blocked from the outside by the sealing material.

In the context of the present invention, the term "a surface of a substrate" means a surface of a glass or quartz substrate and further a surface of a glass or quartz substrate having a silicon oxide film or a silicon nitride film (so-called inorganic film) formed thereon.

The use of the above-described configuration makes it possible to moderate a stress exerted on the peripheral driving circuit and to enhance sealing capability in the region indicated by 300 in FIG. 6.

Especially, a high degree of adhesion can be achieved in the region indicated by 300 in FIG. 6 where the sealing material 315 is in contact with a silicon nitride film 305 which is an inorganic substance (inorganic film) except the region of wiring line 308. This makes it possible to achieve a high degree of adhesion in this region, thereby preventing external moisture from permeating.

In order to moderate a stress, the interlayer insulating films are preferably formed from polyimide resin. The sealing material is preferably formed from epoxy resin to enhance the sealing action further.

The interlayer insulating films can be formed without using polyimide resin.

For example, acrylic resin is also used to form the interlayer insulating film.

The active matrix type liquid crystal displays integrated with a peripheral circuit shown in FIGS. 1 and 6 are used for display devices of photographic apparatuses such as portable video movie apparatuses, portable personal computers, and various information terminals.

DETAILED DESCRIPTION OF PREFERRED EMBODIMENTS

A first embodiment of the present invention will now be described.

The present embodiment employs a configuration in which a sealing material is provided on a region where a peripheral driving circuit is located. Further, in order to prevent damage to the peripheral driving circuit caused by a stress exerted by a filler included in the sealing material, a configuration is employed in which a buffer layer made of polyimide is provided on the peripheral driving circuit.

Figure 1:
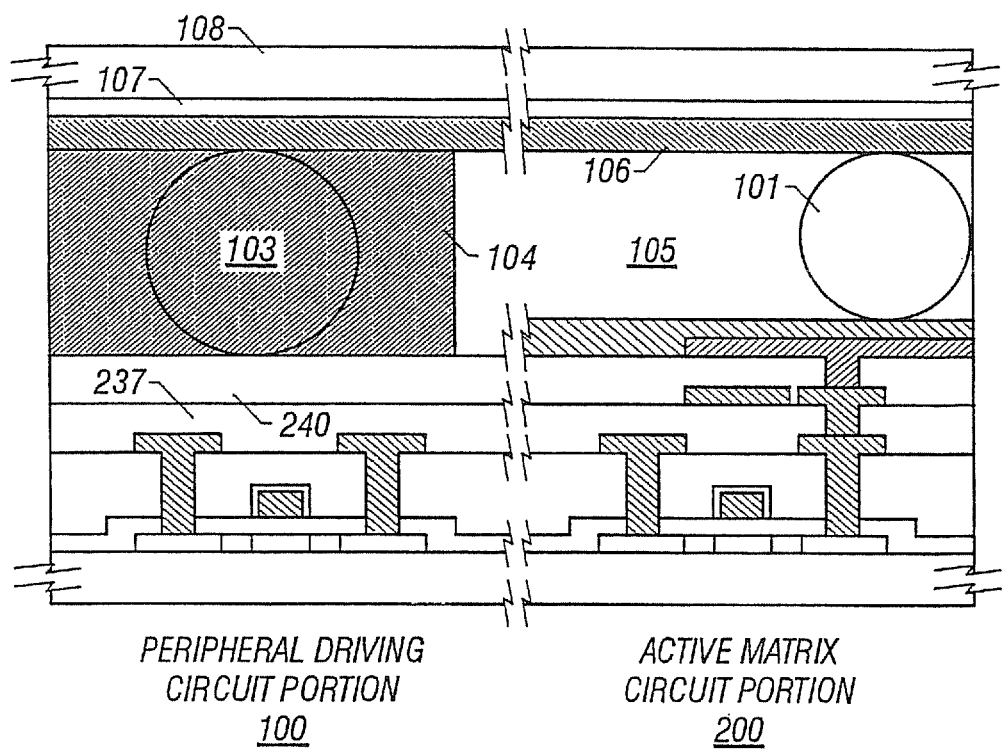
FIG. 1 is a partial sectional view of an active matrix type liquid crystal display which utilizes the present invention.

FIG. 1 is a partial sectional view of an active matrix type liquid crystal display according to the present embodiment. FIG. 1 shows a configuration referred to as "peripheral driving circuit integrated type" having a structure in which a peripheral driving circuit 100 and an active matrix circuit 200 are integrated on the same substrate.

In the configuration shown in FIG. 1, a sealing portion indicated by 104 is provided over the peripheral driving circuit 100. This sealing portion has a sealing function to prevent liquid crystal filled in a space 105 (a gap between the substrates) from leaking out.

The sealing portion 104 is formed from a resin material. The sealing portion 104 is formed by applying the resin material with a spinner, patterning it, and further baking it. Alternatively, it is formed using a printing process.

103 designates a filler which is required for maintaining an interval between the substrates. This filler is made of a resin material and has a cylindrical configuration. In the present embodiment, the resin material used for forming the sealing material 104 includes the filler 103 which is mixed therein in advance.

Resin layers 237 and 240 are provided under the sealing material 104. The resin layers are used as interlayer insulating films and dielectrics for an auxiliary capacitor. The resin layers have a function of moderating a pressure exerted on the peripheral driving circuit 100 by the filler in the sealing material in the region of the peripheral driving circuit 100.

FIGS. 2A through 2E, FIGS. 3A through 3D, and FIG. 4 illustrate fabrication steps to provide the configuration shown in FIG. 1. The fabrication steps described below relate to a configuration in which an n-channel type thin film transistor and a p-channel type thin film transistor are provided in a peripheral driving circuit and in which a p-channel type thin film transistor is provided in an active matrix circuit.

More particularly, in this configuration, a low concentration impurity region is provided in the n-channel type thin film transistor, and a high concentration impurity region is provided between a source/drain region and a channel formation region of the p-channel type thin film transistor.

Such a configuration makes it possible to suppress deterioration of the characteristics of the n-channel type thin film transistor of the peripheral driving circuit. Further, the active matrix circuit can be configured to achieve a low OFF current value and less variation of an ON current value.

FIGS. 2A through 2E, FIGS. 3A through 3D, and FIG. 4 illustrate fabrication steps. FIGS. 2A through 2E illustrate steps for fabricating the n-channel type thin film transistor (and the region around the same) provided in the peripheral driving circuit on the left side thereof. They illustrate steps for fabricating the thin film transistor (and the region around the same) provided in the active matrix region on the right side thereof.

Figure 2A:
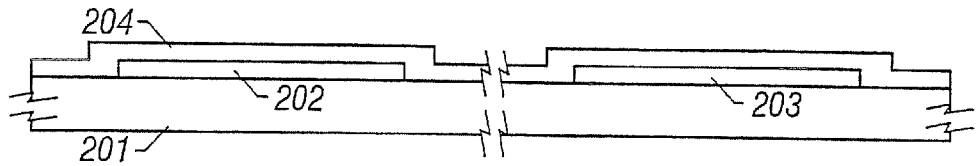
FIGS. 2A through 2E illustrate fabrication steps to provide the configuration shown in FIG. 1.

First, as shown in FIG. 2A, a backing film (not shown) is formed on a glass substrate 201. A silicon oxide film is used as the backing film. This backing film has a function of preventing diffusion of impurities from the glass substrate 201 and moderating a stress to the glass substrate.

Next, an amorphous silicon film (not shown) is formed on the backing film to a thickness of 500 Å using a plasma CVD process. Further, the amorphous silicon film is irradiated with laser beams to be crystallized into a crystalline silicon film. The crystalline silicon film may be obtained using a heating process or irradiation with intense beams.

This crystalline silicon film is patterned to form active layers indicated by 202 and 203 of thin film transistors. 202 designates an active layer of the n-channel type thin film transistor provided in the peripheral driving circuit 100. 203 designates an active layer of the p-channel type thin film transistor provided in the active matrix circuit 200.

Although only two thin film transistors are shown in the figures, tens of thousands to hundreds of thousands (or more) of thin film transistors are integrated in an actual configuration.

After forming the active layers, a plasma CVD process is performed to form a silicon oxide film having a thickness of 1000 Å as a gate insulating film 204. Thus, the state shown in FIG. 2A is achieved.

In the state shown in FIG. 2A, an aluminum film (not shown) is formed by a sputtering process to a thickness of 4000 Å in order to configure gate electrodes (and gate lines). This aluminum film includes 0.1% by weight of scandium.

Next, an anodic oxidation film (not shown) having dense film quality is formed to a thickness of 100 Å. This anodic oxidation is carried out using an ethylene glycol solution including 3% of tartaric acid as the electrolyte. This solution is used after being neutralized with aqueous ammonia.

The anodic oxidation film has a function of enhancing the adhesion of resist masks to be provided later. A silicon nitride film or a metal film may be used instead of the anodic oxidation film. Alternatively, an aluminum oxide film may be formed by means of plasma oxidization in an oxidizing atmosphere.

Next, the aluminum film is patterned using resist masks 205 and 206. This step forms aluminum patterns indicated by 207 and 208 which serve as bases for the gate electrodes. Thus, the state shown in FIG. 2B is achieved.

Figure 2B:
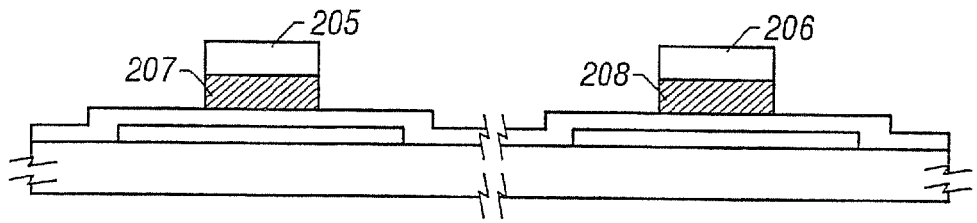

In the state shown in FIG. 2B, anodic oxidation is performed using the aluminum patterns 207 and 208 as anodes. This step forms porous anodic oxides (it is not appropriate to express them as "films") indicated by 211 and 212. The anodic oxides are grown a distance of 5000 Å.

This anodic oxidation is carried out using an aqueous solution including 3% of oxalic acid as the electrolyte.

Figure 2C:
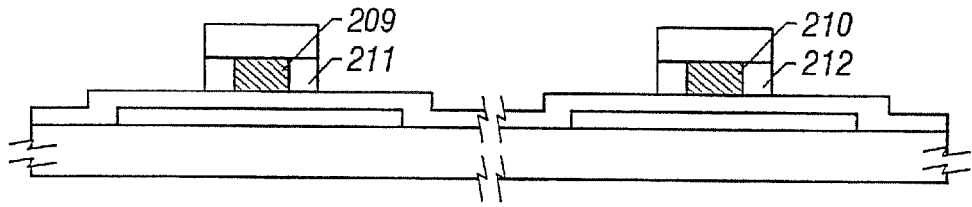

At this step, the presence of the resist masks 205 and 206 causes the anodic oxidation to selectively proceed on side surfaces of the aluminum patterns 207 and 208. The reason is that the presence of the resist masks 205 and 206 prevents the electrolyte from contacting the upper surfaces of the aluminum patterns 207 and 208. The patterns indicated by 209 and 210 here will become gate electrodes later. Thus, the state shown in FIG. 2C is achieved.

Next, the resist masks 205 and 206 are removed. Then, anodic oxidation films having dense film quality are formed. This anodic oxidation is performed using an ethylene glycol solution including 3% of tartaric acid and neutralized with aqueous ammonia as the electrolyte.

At this step, the electrolyte penetrates the porous anodic oxide films 211 and 212. Therefore, dense anodic oxidation films indicated by 213 and 214 are formed.

Figure 2D:
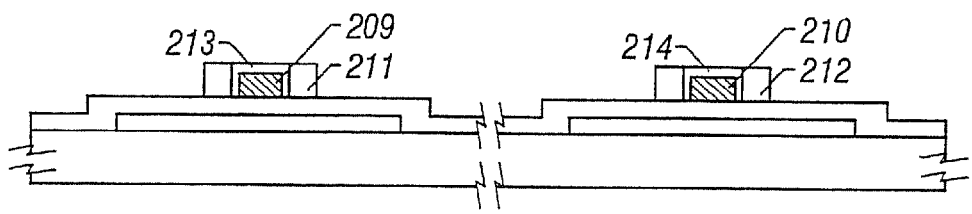

This step defines gate electrodes 209 and 210. The surfaces of these electrodes are covered by the dense anodic oxidation films 213 and 214. These electrodes and wiring lines extending therefrom serve as wiring lines for a first layer. Thus, the state shown in FIG. 2D is achieved.

Figure 2E:
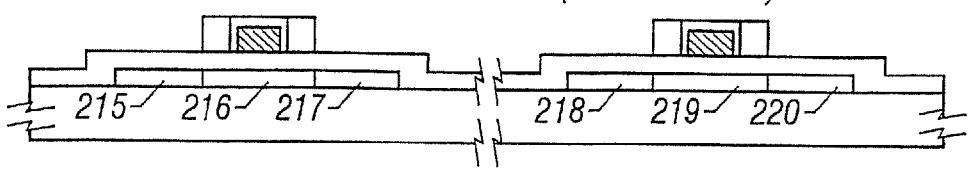

Next, the implantation of P (phosphorus) ions is carried out on the entire surface. At this step, P ions are implanted at a relatively high concentration in order to form source and drain regions (FIG. 2E).

At this step, P ions are implanted in regions 215, 217, 218, and 220. P ions are not implanted in regions 216 and 219.

Figure 3A:
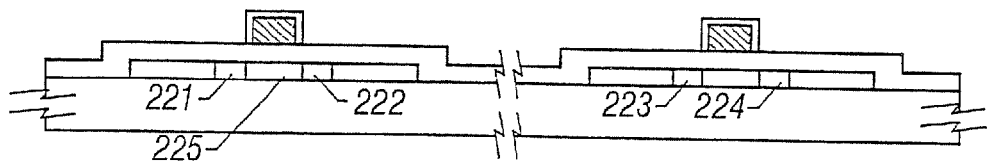
FIGS. 3A through 3D illustrate fabrication steps to provide the configuration shown in FIG. 1.
Figure 3B:
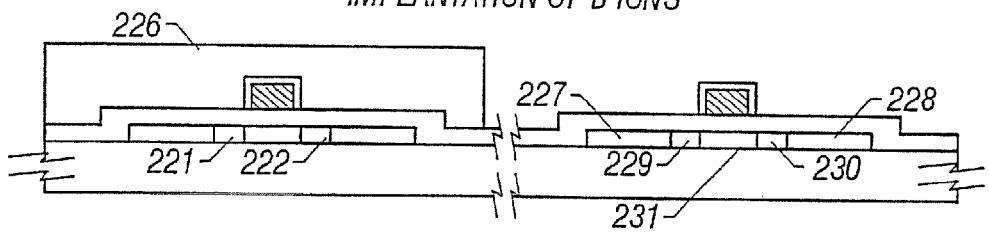

Then, the porous anodic oxide films 211 and 212 are removed. Thus, the state shown in FIG. 3A is achieved. In this state, P ions are implanted again. At this step, P ions are implanted in a dose less than that in the doping condition shown in FIG. 2E.

Thus, the regions indicated by 221, 222, 223, and 224 are formed as low concentration impurity regions, and a channel formation region 225 of the n-channel type transistor is defined (FIG. 3A).

Next, the region where the n-channel type thin film transistor is to be formed is covered with a resist mask 226, and B ions are implanted in such a state. This step is performed on a condition that the regions indicated by 227 and 228 become the source and drain regions of the p-channel type thin film transistor.

At this step, the regions indicated by 227 and 228 become the source and drain regions. Further, the regions indicated by 229 and 230 are formed as regions which exhibit stronger p-type properties than those in the regions indicated by 227 and 228.

This is because the concentration of P elements included in the regions 229 and 230 is lower than that in the regions 227 and 228.

Specifically, more B elements are required in the regions 227 and 228 to neutralize P elements and, as a result, the regions 229 and 230 exhibit stronger p-type properties. Further, the region indicated by 231 is defined as the channel formation region of the p-channel type thin film transistor.

When the implantation of impurity ions is complete, the resist mask 226 is removed. Then, laser irradiation is performed to activate the implanted impurities and to anneal damage on the semiconductor films caused by the impact of the ions.

Next, a first interlayer insulating film 232 is formed. A silicon nitride film having a thickness of 4000 Å is formed here as the interlayer insulating film 232 using a plasma CVD process.

Figure 3C:
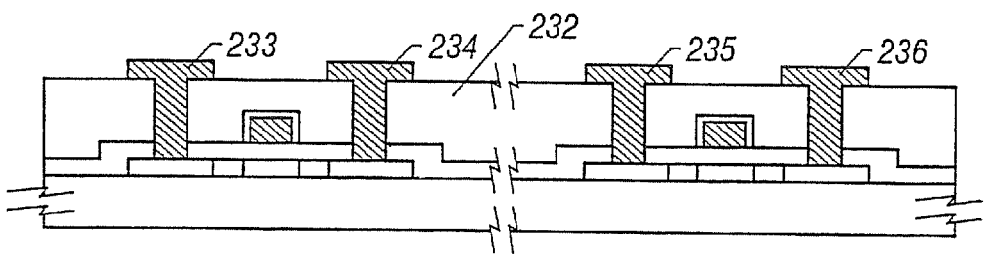

Then, contact holes are formed to form wiring lines (electrodes) 233 through 236 in a second layer. Thus, the state shown in FIG. 3C is achieved.

Next, a second interlayer insulating film 237 is formed. A resin film having a thickness of 15000 Å is formed here as the interlayer insulating film 237. It is formed using a spin coating process.

Figure 3D:
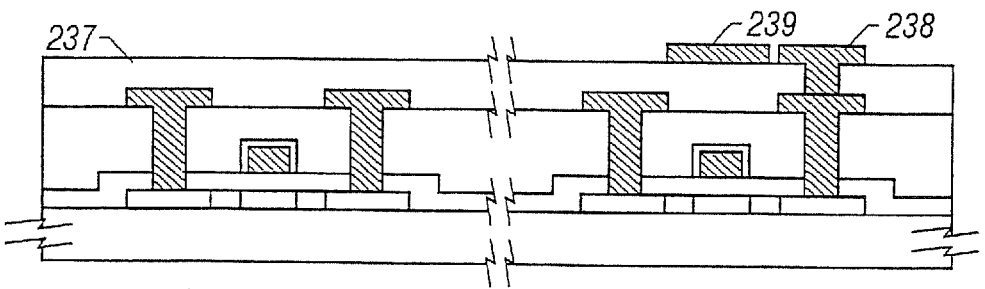

Next, a contact hole is formed to form a wiring line (electrode) 238 in a third layer. At the same time, a light shield film 239 for shading the thin film transistor provided in the active matrix circuit 200 is formed. This light shield film 239 forms an auxiliary capacitor in cooperation with a pixel electrode which is opposite thereto across a interlayer insulating film (resin film) to be formed later. Thus, the state shown in FIG. 3D is achieved.

Figure 4:
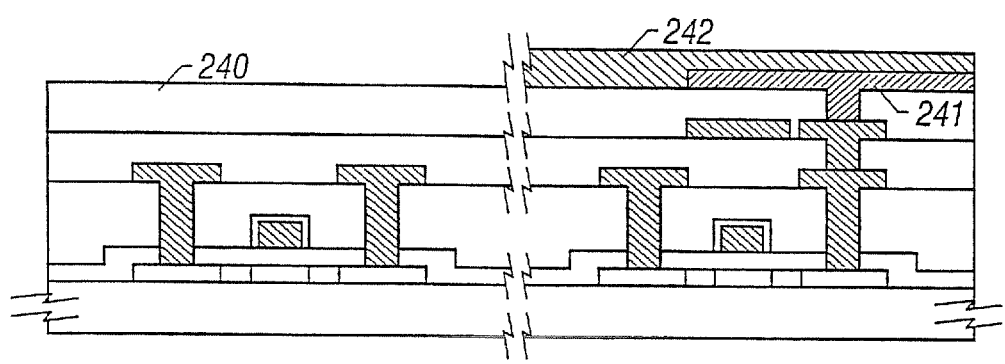
FIG. 4 illustrates a fabrication step to provide the configuration shown in FIG. 1.

Next, a third interlayer insulating film 240 is formed as shown in FIG. 4. A resin layer having a thickness of 5000 Å is formed here as the third interlayer insulating film 240 using a spin coating process. Then, a contact hole is formed to form a pixel electrode 241 using ITO.

In the present embodiment, an auxiliary capacitor is formed by the light shield film 239 and the pixel electrode which are provided so as to sandwich the third interlayer insulating film (resin film) 240.

Further, a rubbing film 242 is formed. The rubbing film 242 is made of resin and is formed using a printing process. In the present embodiment, the rubbing film is formed only in the region of the active matrix circuit. A rubbing process is carried out after the rubbing film 242 is formed.

Then, an opposite substrate 108 is provided as shown in FIG. 1. An opposite electrode 107 and a rubbing film 106 are formed on the opposite substrate 108. The opposite substrate 108 and the substrate shown in FIG. 4 is put together to complete the configuration shown in FIG. 1.

A second embodiment of the present invention will now be described.

The present embodiment is an example in which bottom-gate type thin film transistors are used in a liquid crystal display integrated with a peripheral driving circuit.

Figure 5:
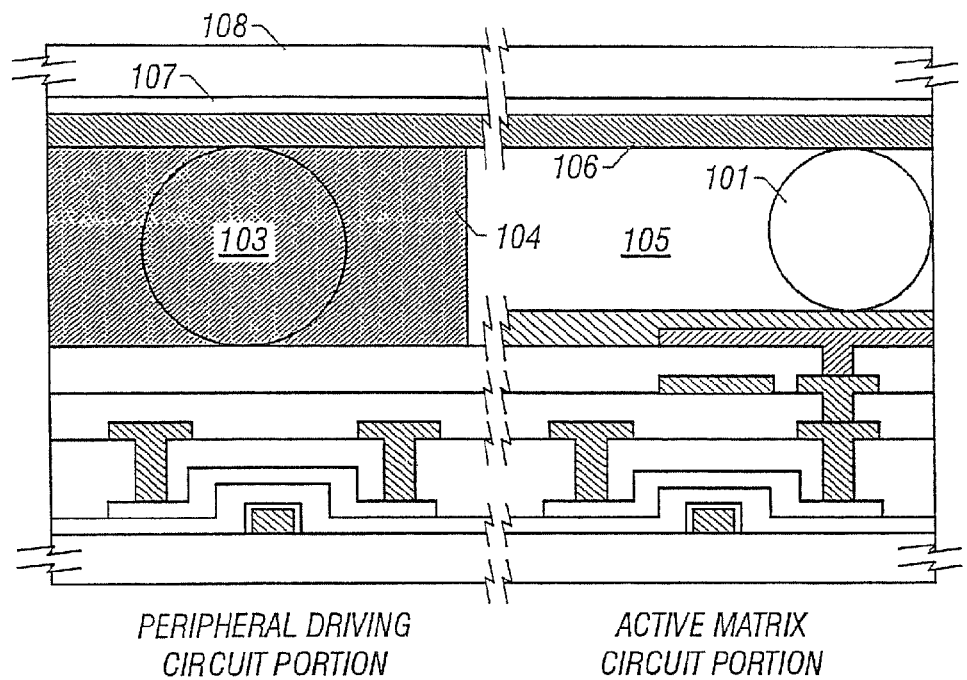
FIG. 5 is a partial sectional view of another active matrix type liquid crystal display which utilizes the present invention.

FIG. 5 is a sectional view corresponding to FIG. 1. The present embodiment is different from the configuration shown in FIG. 1 in the structure of the thin film transistors. The configuration is otherwise similar to that shown in FIG. 1.

A third embodiment of the present invention will now be described.

Figure 6:
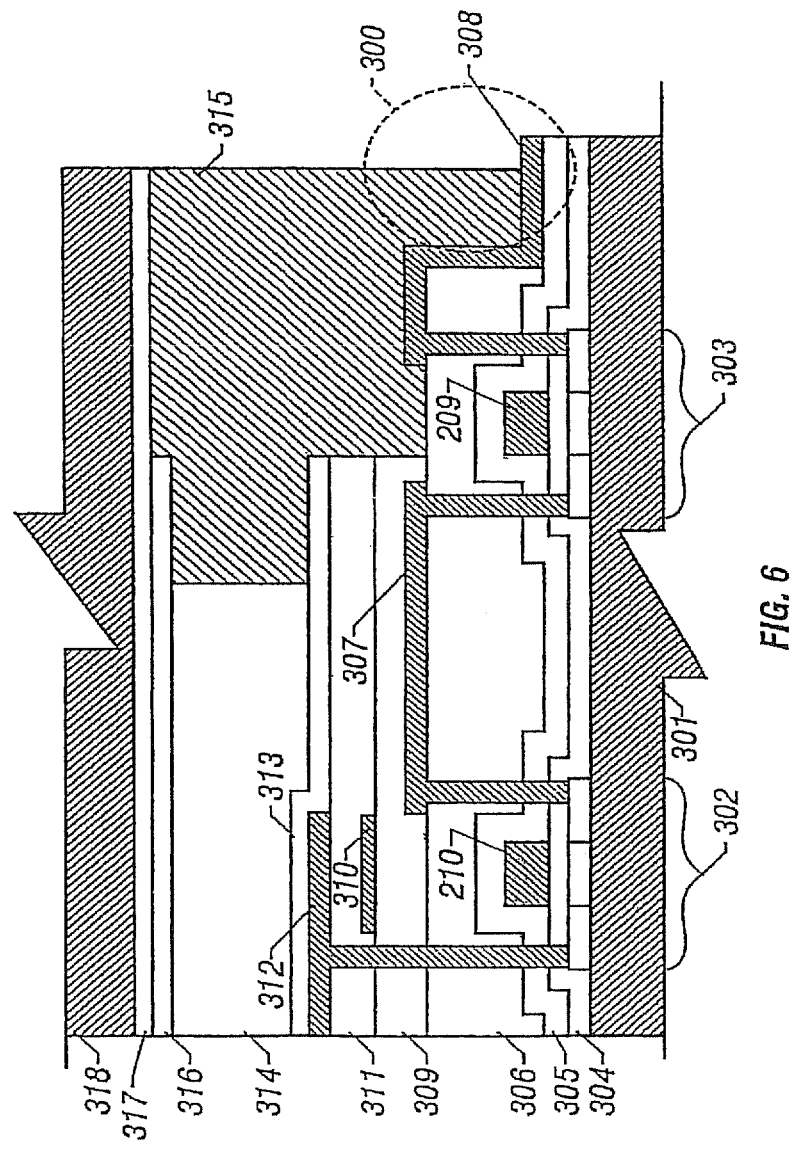
FIG. 6 is a partial sectional view of a liquid crystal panel which utilizes the present invention.

FIG. 6 schematically shows the configuration of the present embodiment. FIG. 6 is a schematic sectional view of an active matrix type liquid crystal display integrated with a peripheral driving circuit.

In FIG. 6, 301 and 318 designate a pair of glass substrates that constitute a liquid crystal panel. A liquid crystal material, an active matrix circuit, and a peripheral driving circuit for driving the active matrix circuit are provided in a gap between the pair of glass substrates.

302 designates a thin film transistor provided in the active matrix circuit portion. Although only one thin film transistor is provided in FIG. 6, in practice, thin film transistors are provided in a quantity at least equal to the number of pixels.

303 designates a thin film transistor provided in the peripheral driving circuit. Although only one thin film transistor 303 is provided in FIG. 6, in practice, a combination of p-channel type and n-channel type thin film transistors is provided in quantities required for forming a shift register circuit and a buffer circuit.

304 designates a interlayer insulating film. The gate insulating film 304 is constituted by a silicon oxide film. 305 designates a silicon nitride film that constitutes a first interlayer insulating film. 306 designates a resin interlayer film made of polyimide that constitutes the first interlayer insulating film in combination with the silicon nitride film 305. The resin interlayer film 306 made of polyimide is characterized in that its surface can be flattened.

307 designates a line which extends from the drain of the thin film transistor 303 provided in the peripheral driving circuit and which is connected to the source of the thin film transistor 302 provided in the pixel matrix circuit.

308 designates a line connected to the source of the thin film transistor 303 provided in the peripheral driving circuit. This line 308 constitutes an external terminal of the liquid crystal panel.

309 designates a resin interlayer film made of polyimide that constitutes a second interlayer insulating film. 310 designates a light shield film made of titanium formed on the resin interlayer film 309 that constitutes the second interlayer insulating film. This light shield film 310 is provided to prevent the thin film transistor 302 from being irradiated with light.

311 designates a resin interlayer film made of polyimide that constitutes a third interlayer insulating film. 312 designates an ITO film that constitutes a pixel electrode. The ITO film 312 and the light shield film 310 form an auxiliary capacitor through the resin interlayer film 311. Such a configuration makes it possible to obtain a required auxiliary capacitor without reducing the aperture ratio.

The resin interlayer films 306, 309 and 311 can be formed without using polyimide resin. For example, acrylic resin is also used to form the interlayer insulating film.

313 designates an orientation film made of polyimide. This orientation film 313 exerts an orientation regulating force on liquid crystal 314 which is in contact therewith.

315 designates epoxy resin for sealing the liquid crystal material. The liquid crystal material 314 is held between the pair of glass substrates 318 and 301 by the epoxy resin 315.

The epoxy resin 315 includes glass fibers referred to as "filler" for maintaining the gap for the liquid crystal layer.

316 designates an orientation film made of polyimide provided on the opposite substrate (the substrate 318 is referred to as "opposite substrate"). 317 designates an opposite electrode.

The present embodiment is characterized in that the resin films 311, 309, and 306 that constitute interlayer films overlap the epoxy resin 315 that constitutes a sealing material in regions except a part of the epoxy resin 315.

This makes it possible to moderate a stress using the resin interlayer films made of polyimide and to prevent moisture from permeating from the outside of the panel using the epoxy resin that constitutes a sealing material.

The resin films indicated by 311, 309, and 306 are elastic and have a function of moderating a stress exerted externally.

However, they substantially have no function as a barrier to prevent the penetration of moisture because they absorb moisture.

On the other hand, the epoxy resin 315 that constitutes a sealing material is rigid and substantially has no function of moderating a stress, but it has a sufficient function of blocking moisture.

The use of the configuration disclosed in the present embodiment allows the effects of both of those components to be demonstrated.

Especially, the degree of sealing can be improved where the epoxy resin film and the polyimide resin film do not overlap each other at the part. Specifically, since epoxy resin and polyimide exhibit poor adhesion to each other, the arrangement to prevent them from overlapping each other at the part indicated by 300 makes it possible to enhance a sealing effect provided by epoxy resin in such a part.

It is thus possible to provide a function of sealing liquid crystal in the cell at the part indicated by 300 and to obtain a configuration that prevents impurities and dusts from entering the liquid crystal layer from the outside.

Figure 7:
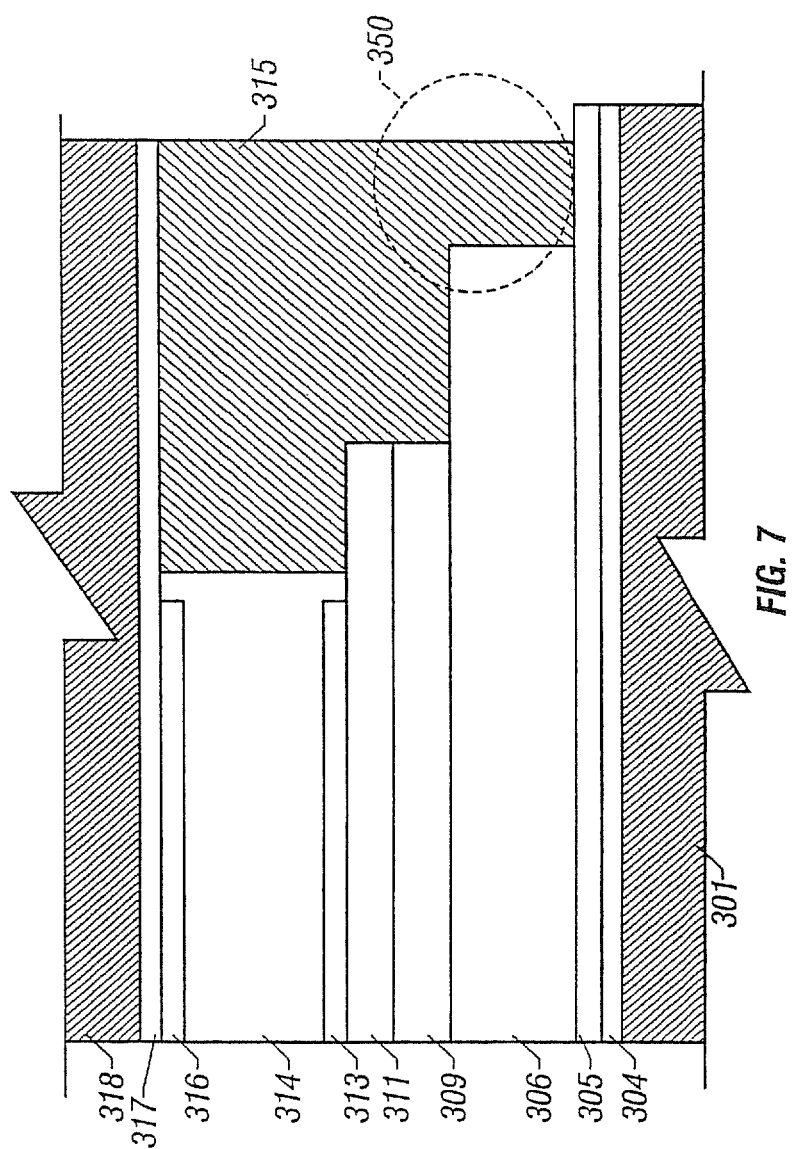
FIG. 7 is a partial sectional view of a liquid crystal panel which utilizes the present invention.

FIG. 7 is a sectional view of a region where the wiring line 308 is not present. As apparent from FIG. 7, in the region indicated by 350, a high degree of adhesion can be achieved between the sealing material 315 and the silicon nitride film 305 because they are in direct contact with each other.

The inventors understand that a quite high degree of adhesion can be achieved between epoxy resin and an inorganic material. It is therefore quite advantageous to enhance the sealing of the liquid crystal cell at the region indicated by 350 in FIG. 7.

Further, the structure of the thin film transistor is not limited to the top-gate type as in the present embodiment but may be a inverted staggered type as in the second embodiment.

A fourth embodiment of the present invention will now be described.

The present embodiment relates to an improvement on the configuration according to the third embodiment. Sealing may not be maintained in the region indicated by 300 in FIG. 6 because of a step which is a result of the presence of the wiring line 308.

Figure 8:
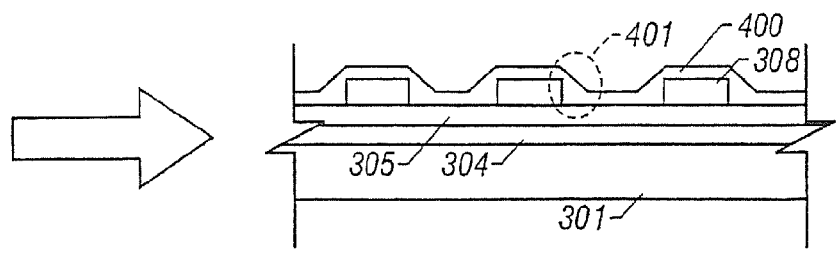
FIG. 8 is a partial sectional view of a liquid crystal panel which utilizes the present invention.

The present embodiment is a device for solving this problem. FIG. 8 shows a section of the region 308 in FIG. 8 as viewed from the right-hand side of FIG. 6. The reference numbers in FIG. 8 which are the same as those in FIGS. 6 and 7 designate the same locations.

In the present embodiment, a silicon oxide film 400 is formed by applying a solution after forming the wiring line 308. Such a silicon oxide film has already been put in actual use as a final passivation film or flat film of an integrated circuit.

Figure 9:
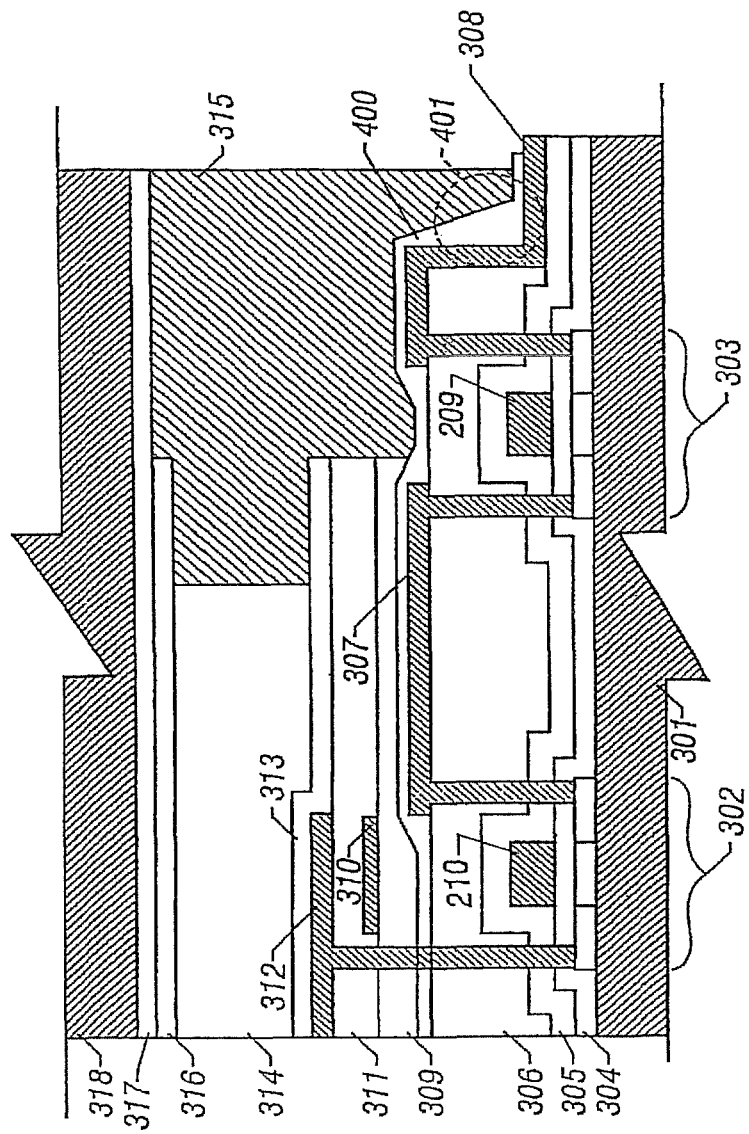
FIG. 9 is a partial sectional view of a liquid crystal panel which utilizes the present invention.

FIG. 9 shows a section as viewed from the right-hand side of FIG. 8. Since a silicon oxide film 400 is formed by applying a solution, a step as indicated by 401 can be filled. This makes it possible to improve the adhesion of the sealing material formed thereon to achieve a preferable sealing function.

As apparent from FIG. 9, it is necessary to remove the silicon oxide film 400 above the end of the line 308 to maintain contact with the outside. FIG. 9 may be regarded as corresponding to FIG. 6.

A fifth embodiment of the present invention will now be described.

The present embodiment relates to a configuration for preventing the breakage and poor conductivity at the line 308 as a result of the application of a stress from the sealing material 315 at the end of the sealing material indicated by 300 in FIG. 6.

The wiring line 308 may be subjected to a stress from the sealing material 315 depending on the type of the epoxy resin that forms the sealing material 315 and hardening conditions for the same, and defects may occasionally occur in the wiring line 308.

Figure 10:
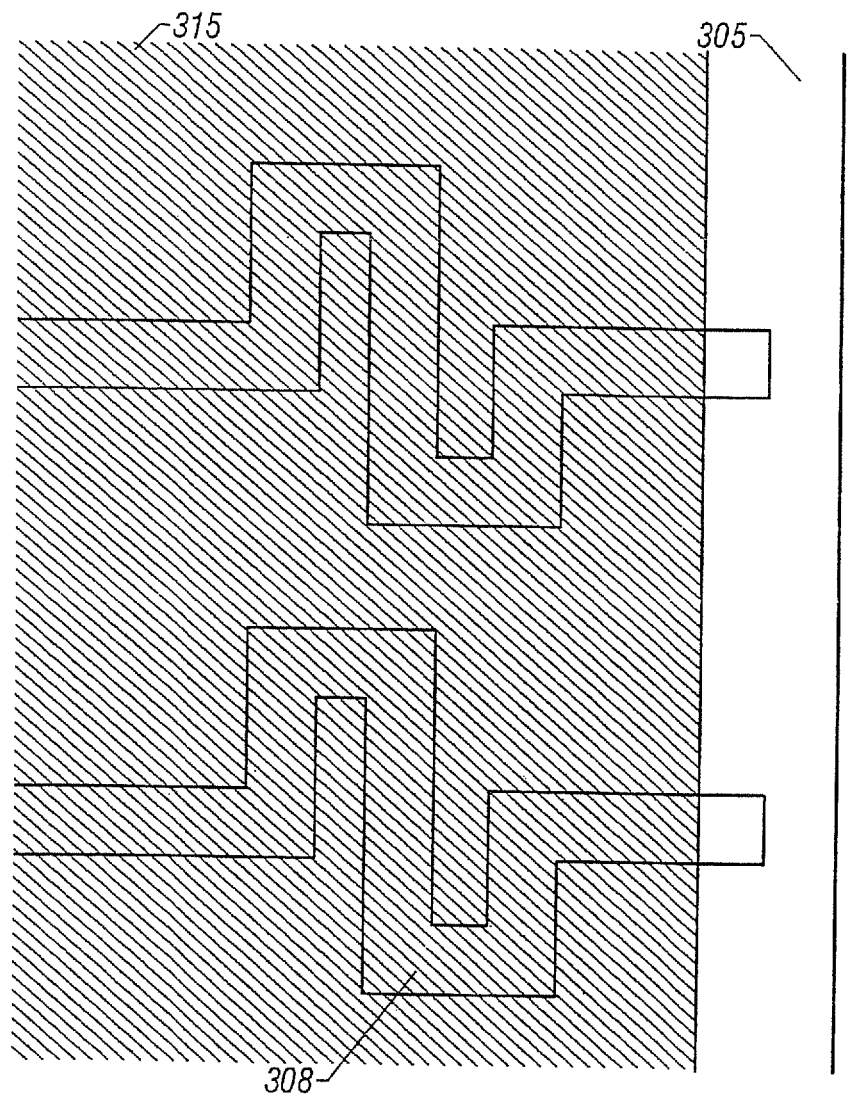
FIG. 10 is a partial sectional view of a liquid crystal panel which utilizes the present invention.

Under such circumstances, according to the present embodiment, the wiring line 308 is patterned as shown in FIG. 10 under the sealing material 315.

This makes it possible to prevent the occurrence of defects at the wiring pattern 308 as a result of the application of a stress from the sealing material 315.

In addition, it is possible to suppress the reduction of sealing properties at side surfaces of the pattern of the wiring line 308 as shown in the fourth embodiment.

A sixth embodiment of the present invention will now be described.

Figure 11A:
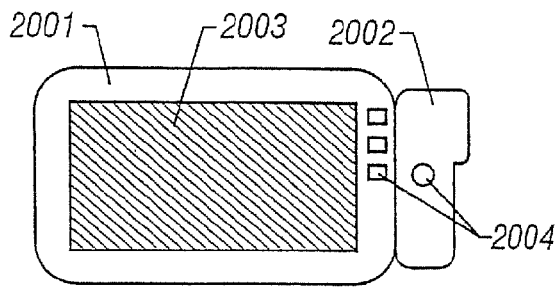
FIGS. 11A through 11F are views schematically showing apparatuses which utilize the present invention.

The present embodiment shows examples of apparatuses having liquid crystal panels as described in the first through fifth embodiments. Configurations as shown in FIGS. 11A through 11F can be used on liquid crystal panels included in such apparatuses. FIG. 11A shows a portable information processing terminal. This apparatus includes a main body 2001 having a display device 2003 utilizing a liquid crystal panel, operation buttons 2004, and a CCD camera 2002. This apparatus has a configuration which allows information to be obtained and transmitted over a telephone network.

As the liquid crystal panel used for the display device, a transmission type or reflection type panel may be used. A reflection type panel is advantageous if power consumption is to be reduced.

Figure 11B:
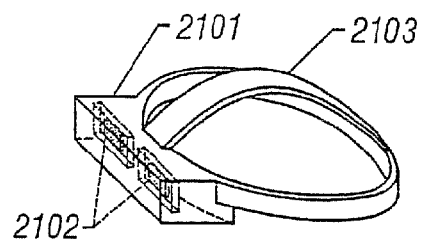

FIG. 11B shows an apparatus referred to as "head mount display" which is put on the head of a user and displays images just in front of the eyes, thereby performing a function of displaying images as if they were real scenes in front of the user. This apparatus includes a liquid crystal display 2102 at a display device portion and has a structure such that a main body 2101 is secured to the head of the user with a band 2103.

As the liquid crystal panel, a transmission type or reflection type panel may be used.

Figure 11C:
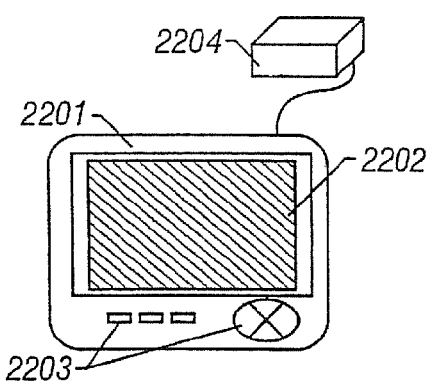

FIG. 11C shows a so-called car navigation system having a main body 2201 on which a display device 2202 utilizing a liquid crystal panel and operation buttons 2203 are provided and has a function of receiving waves from broadcast satellites by an antenna 2204.

As the liquid crystal panel, a transmission type or reflection type panel may be used.

Figure 11D:
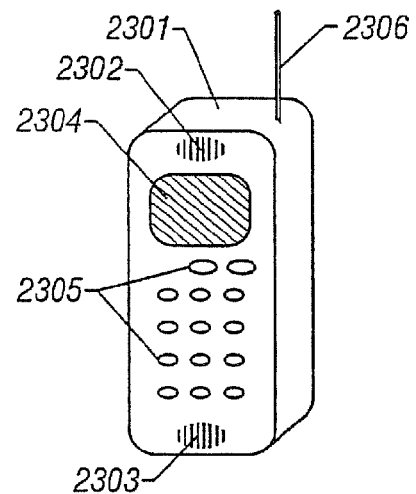

FIG. 11D shows a portable telephone having a main body 2301 on which a display device 2304 utilizing a liquid crystal display, an audio input portion 2303, an audio output portion 2302, operation buttons 2305, and an antenna 2306 are provided.

Figure 11E:
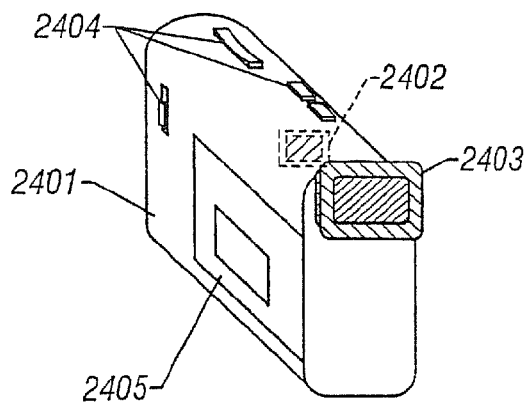

FIG. 11E shows a video camera having a main body 2401 on which operation buttons 2404, a display device 2402 constituted by a liquid crystal display, an eyepiece 2403 for viewing images displayed on the display device 2402, and a tape holder 2405 for containing a magnetic tape for storing photographed images are provided.

As the liquid crystal panel forming the display device 2402, a transmission type panel is normally used which forms images by modulating light from a back-light device.

Figure 11F:
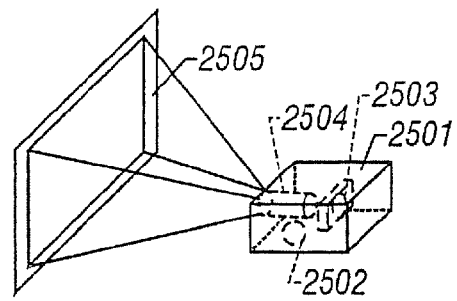

FIG. 11F shows a projection type projector in which a display device 2503 for optically modulating light from a light source is provided at a main body 2501 thereof. The display device 2503 shown in FIG. 11F is a device constituted by a reflection type liquid crystal panel.

An image which has been optically modulated by the display device is magnified by an optical system 2504 and is projected on a screen 2505. An image is viewed from the side of the main body as an image projected on the screen 2505.

The use of the invention disclosed in this specification makes it possible to provide a configuration of an active matrix type liquid crystal display integrated with a peripheral driving circuit in which the surface area excluding the region of a pixel matrix circuit is minimized.

Specifically, by employing a configuration in which a sealing material is provided on a peripheral driving circuit, the surface area excluding a pixel region can be minimized. Such a configuration further makes it possible to prevent damage to the peripheral driving circuit due to a pressure exerted by the sealing material.

The use of the invention disclosed in this specification makes it possible to prevent moisture from permeating into a thin film transistor circuit and to prevent a stress exerted on a liquid crystal panel from adversely affecting thin film transistors.

Specifically, a configuration can be obtained which prevents thin film transistors from being adversely affected by a stress exerted thereon during the fabrication and handling of a liquid crystal panel and prevents moisture from permeating into the liquid crystal panel.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A display device comprising:
   a first substrate and a second substrate opposed to each other;
   a liquid crystal between the first substrate and the second substrate;
   an active matrix circuit and a driving circuit, each comprising a thin film transistor over the first substrate, wherein the thin film transistor includes an active layer and a gate electrode with a gate insulating film therebetween;
   a resin layer over the thin film transistor of the active matrix circuit and the thin film transistor of the driving circuit;
   a pixel electrode over the resin layer;
   a spacer over the pixel electrode;
   a sealing material overlapping the driving circuit; and
   a filler included in the sealing material, wherein the filler overlaps the thin film transistor of the driving circuit.

2. A display device according to claim 1, wherein the filler has a cylindrical configuration.

3. A display device according to claim 1, wherein the filler comprises a resin material.

4. A display device according to claim 1, wherein the spacer has a spherical shape.

5. A display device according to claim 1, wherein the resin layer is a stacked-layer of plurality of resin layers.

6. A display device according to claim 1, wherein the resin layer comprises polyimide.

7. A display device according to claim 1, further comprising a rubbing film formed over the resin layer and in contact with the spacer.

8. A display device according to claim 1, wherein the active layer of the thin film transistor in the driving circuit includes crystalline silicon.

9. A display device according to claim 1, wherein the display device is incorporated in one selected from the group consisting of a portable information processing terminal, a head mount display, a navigation system, a portable telephone, a camera, and a projector.

10. A display device comprising:
    a first substrate and a second substrate opposed to each other;
    a liquid crystal between the first substrate and the second substrate;
    an active matrix circuit and a driving circuit, each comprising a thin film transistor over the first substrate, wherein the thin film transistor includes an active layer and a gate electrode with a gate insulating film therebetween;
    a resin layer over the thin film transistor of the active matrix circuit and the thin film transistor of the driving circuit;
    a pixel electrode over the resin layer;
    a spacer over the pixel electrode;
    a sealing material overlapping the driving circuit; and
    a filler included in the sealing material, wherein the filler overlaps the thin film transistor of the driving circuit, and wherein a height of the filler is larger than a height of the spacer.

11. A display device according to claim 10, wherein the filler has a cylindrical configuration.

12. A display device according to claim 10, wherein the filler comprises a resin material.

13. A display device according to claim 10, wherein the spacer has a spherical shape.

14. A display device according to claim 10, wherein the resin layer is a stacked-layer of plurality of resin layers.

15. A display device according to claim 10, wherein the resin layer comprises polyimide.

16. A display device according to claim 10, further comprising a rubbing film formed over the resin layer and in contact with the spacer.

17. A display device according to claim 10, wherein the active layer of the thin film transistor in the driving circuit includes crystalline silicon.

18. A display device according to claim 10, wherein the display device is incorporated in one selected from the group consisting of a portable information processing terminal, a head mount display, a navigation system, a portable telephone, a camera, and a projector.

19. A display device comprising:
    a first substrate and a second substrate opposed to each other;
    a liquid crystal between the first substrate and the second substrate;
    an active matrix circuit and a driving circuit, each comprising a thin film transistor over the first substrate, wherein the thin film transistor includes an active layer and a gate electrode with a gate insulating film therebetween;
    a resin layer over the thin film transistor of the active matrix circuit and the thin film transistor of the driving circuit;
    a pixel electrode over the resin layer;
    a spacer over the pixel electrode;
    a sealing material overlapping the driving circuit; and
    a filler included in the sealing material, wherein the filler is in contact with the resin layer, and wherein the filler overlaps the thin film transistor of the driving circuit.

20. A display device according to claim 19, wherein the filler has a cylindrical configuration.

21. A display device according to claim 19, wherein the filler comprises a resin material.

22. A display device according to claim 19, wherein the spacer has a spherical shape.

23. A display device according to claim 19, wherein the resin layer is a stacked-layer of plurality of resin layers.

24. A display device according to claim 19, wherein the resin layer comprises polyimide.

25. A display device according to claim 19, further comprising a rubbing film formed over the resin layer and in contact with the spacer.

26. A display device according to claim 19, wherein the active layer of the thin film transistor in the driving circuit includes crystalline silicon.

27. A display device according to claim 19, wherein the display device is incorporated in one selected from the group consisting of a portable information processing terminal, a head mount display, a navigation system, a portable telephone, a camera, and a projector.

28. A display device comprising:
   a first substrate and a second substrate opposed to each other;
   a liquid crystal between the first substrate and the second substrate;
   an active matrix circuit and a driving circuit, each comprising a thin film transistor over the first substrate, wherein the thin film transistor includes an active layer and a gate electrode with a gate insulating film therebetween;
   a resin layer over the thin film transistor of the active matrix circuit and the thin film transistor of the driving circuit;
   a pixel electrode over the resin layer;
   a spacer over the pixel electrode;
   a sealing material overlapping the driving circuit; and
   a filler included in the sealing material, wherein the filler overlaps the thin film transistor of the driving circuit, and
   wherein the resin layer has a thickness equal to or greater than one-half of a diameter of the filler.

29. A display device according to claim 28, wherein the filler has a cylindrical configuration.

30. A display device according to claim 28, wherein the filler comprises a resin material.

31. A display device according to claim 28, wherein the spacer has a spherical shape.

32. A display device according to claim 28, wherein the resin layer is a stacked-layer of plurality of resin layers.

33. A display device according to claim 28, wherein the resin layer comprises polyimide.

34. A display device according to claim 28, further comprising a rubbing film formed over the resin layer and in contact with the spacer.

35. A display device according to claim 28, wherein the active layer of the thin film transistor in the driving circuit includes crystalline silicon.

36. A display device according to claim 28, wherein the display device is incorporated in one selected from the group consisting of a portable information processing terminal, a head mount display, a navigation system, a portable telephone, a camera, and a projector.

37. A display device comprising:
   a first substrate and a second substrate opposed to each other;
   a liquid crystal between the first substrate and the second substrate;
   an active matrix circuit and a driving circuit, each comprising a thin film transistor over the first substrate, wherein the thin film transistor includes an active layer and a gate electrode with a gate insulating film therebetween;
   a resin layer over the thin film transistor of the active matrix circuit and the thin film transistor of the driving circuit;
   a pixel electrode over the resin layer;
   a spacer over the pixel electrode;
   a sealing material overlapping the driving circuit; and
   a filler included in the sealing material, wherein the filler overlaps the thin film transistor of the driving circuit,
   wherein a height from a surface of the first substrate to a bottom of the sealing material where the filler does not exist is substantially same as a height from a surface of the first substrate to a bottom of the filler.

38. A display device according to claim 37, wherein the filler has a cylindrical configuration.

39. A display device according to claim 37, wherein the filler comprises a resin material.

40. A display device according to claim 37, wherein the spacer has a spherical shape.

41. A display device according to claim 37, wherein the resin layer is a stacked-layer of plurality of resin layers.

42. A display device according to claim 37, wherein the resin layer comprises polyimide.

43. A display device according to claim 37, further comprising a rubbing film formed over the resin layer and in contact with the spacer.

44. A display device according to claim 37, wherein the active layer of the thin film transistor in the driving circuit includes crystalline silicon.

45. A display device according to claim 37, wherein the display device is incorporated in one selected from the group consisting of a portable information processing terminal, a head mount display, a navigation system, a portable telephone, a camera, and a projector.

* * * * *